Figure 1:
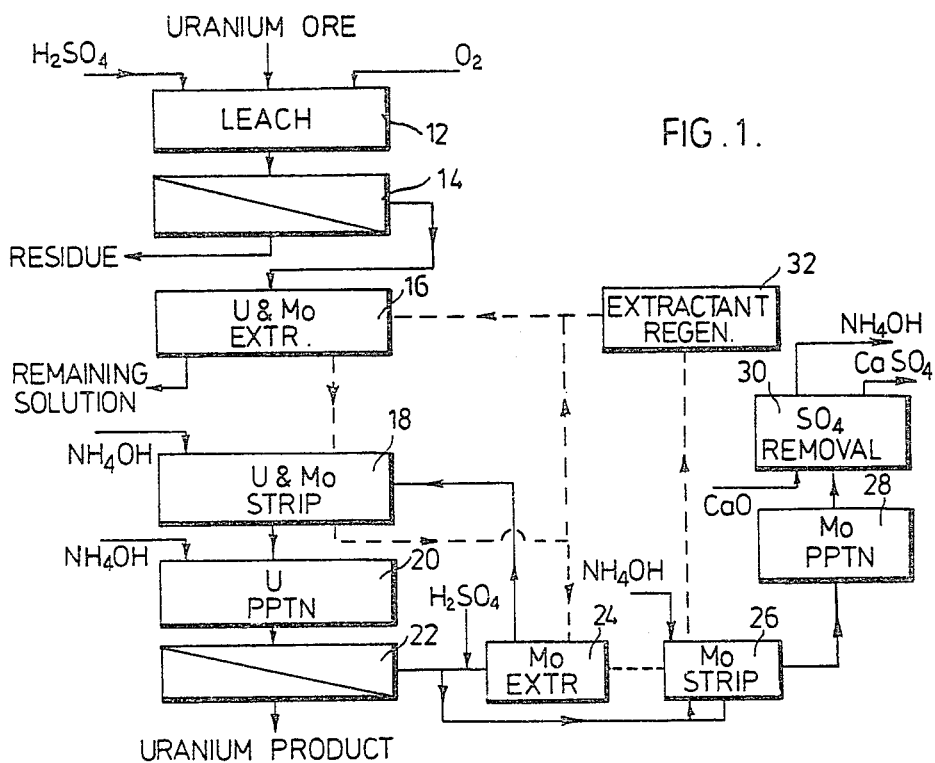

United States Patent [19]

Weir et al.

[11] 4,405,566
[45] Sep. 20, 1983

[54] REMOVAL OF URANIUM FROM SULPHATE SOLUTIONS CONTAINING MOLYBDENUM

[75] Inventors: Donald R. Weir, Fort Saskatchewan; Roman M. Genik-Sas-Berezowsky, Edmonton, both of Canada

[73] Assignee: Sherritt Gordon Mines Limited, Toronto, Canada

[21] Appl. No.: 192,929

[22] Filed: Oct. 1, 1980

[30] Foreign Application Priority Data

Aug. 22, 1980 [CA] Canada ................................. 358967

[51] Int. Cl.³ ...................... C01G 43/00; C01G 39/00; C01G 39/06
[52] U.S. Cl. ....................................... 423/15; 423/11; 423/18; 423/20; 423/54; 423/55
[58] Field of Search .................. 423/2, 15, 18, 20, 54, 423/55, 11

[56] References Cited

PUBLICATIONS

Merritt, Robert C., "The Extractive Metallurgy of Uranium" 1971, pp. 211-215, 240-246, 413.
Lennemann, W. L. and F. E. McGinley, "Advances in Uranium ore Processing", Mining Congress Journal, 45(7), 1959, pp. 59-63.

Primary Examiner—Deborah L. Kyle
Assistant Examiner—Matthew A. Thexton
Attorney, Agent, or Firm—Robert F. Delbrdge; Arne I. Fors

[57] ABSTRACT

A process for recovering uranium values from a sulphate solution containing dissolved uranium and molybdenum and with a pH not exceeding about 5.5, includes reacting the solution with ammonia at a pH in the range of from about 8 to about 10, without the solution existing for any significant time at a pH of around 7, with resultant precipitation of uranium values relatively uncontaminated by molybdenum. The uranium containing precipitate is separated from the remaining solution while maintaining the pH of the remaining solution within the same range.

12 Claims, 2 Drawing Figures

REMOVAL OF URANIUM FROM SULPHATE SOLUTIONS CONTAINING MOLYBDENUM

This invention relates to the recovery of uranium values from sulphate solution containing dissolved uranium and molybdenum.

Extraction of uranium from its ores is usually carried out by processes which include leaching the ore or a concentrate thereof. Many uranium ores also contain molybdenum, and in such cases, the leaching step usually results in the production of a leach solution containing not only dissolved uranium values but also dissolved molybdenum in addition to the usual impurities such as iron, aluminum, magnesium, calcium and silica. Uranium values are then usually removed from the leach solution by ion exchange or solvent extraction to produce a purified uranium containing solution from which uranium values can be precipitated.

When the leach solution also contains dissolved molybdenum however, it is difficult to produce a precipitated uranium product which is sufficiently free from contamination by molybdenum. For example, it is known that by using a solvent extraction system such as a tertiary amine-isodecanol-kerosene system, it is possible to selectively extract uranium values from the leach solution, that is to say without also extracting any substantial quantities of most of the impurities present in the leach solution. Also, with such a solvent extraction system, some impurities which are extracted may be readily reduced to acceptable levels by appropriately treating the loaded extractant, for example by scrubbing or crowding. However, with such a solvent extraction system, molybdenum is readily and strongly co-extracted with the uranium from the leach solution, and no suitable procedure is known for selectively removing molybdenum from the loaded extractant. Thus, in the subsequent uranium precipitation step, the precipitated uranium product may be contaminated with molybdenum to an undesirably high level.

Some proposals have been made to deal with the problem of molybdenum contamination, but such proposals have various disadvantages. For example, both uranium and molybdenum may be stripped from the loaded extractant by sodium carbonate solution, with uranium values subsequently being selectively precipitated by sodium hydroxide. Although the precipitated uranium product in this case may be adequately free from molybdenum, the uranium product may be undesirably contaminated by sodium and thus require re-processing. Also, an undesirably high amount of uranium values may not be precipitated and will remain in solution. Further, the presence of sodium ions presents enviromental problems.

Another proposal is to selectively strip uranium values from the loaded extractant by an acidified chloride solution. Although adequate separation of uranium and molybdenum values may be achieved in this way, the presence of chloride ions presents enviromental problems.

The most common known method of stripping uranium values from the loaded extractant is with ammonium sulphate solution, and especially by the use of ammonium sulphate solution in several countercurrent stages in which the pH in successive stages is maintained at successively higher values by the addition of ammonia in the range of from about 3.5 to about 5.5, more usually in the range of from about 3.8 to about 4.3. Uranium values are subsequently precipitated from the resulting solution by raising by the pH by the addition of ammonia to a value in the range of from about 6.5 to about 7.5, the uranium values being precipitated as an ammonium diuranate. Although such countercurrent stripping can be controlled to effect some uranium-molybdenum separation, it is not as effective in this respect as the other proposals previously mentioned. However, because this method does not have the disadvantages of the other proposals, it may be satisfactory when the molybdenum content of the leach solution relative to the uranium content is not too high, for example from about 0.002 to about 0.01 g/L molybdenum for solutions containing from about 0.5 to about 5 g/L $U_3O_8$.

In the past, precipitation of uranium values from strip solutions at a pH higher than 8 has been avoided because the precipitate at such a pH tends to be gelatinous and has been considered difficult to handle. Thus, conventionally, precipitation has been carried out at a pH in the range of from about 6.5 to about 7.5, usually from about 7.0 to about 7.3, since at such a pH uranium precipitation is virtually quantitative and the precipitate possesses good liquid-solids separation characteristics. However, with uranium precipitation at such pH values, molybdenum is also quantitatively precipitated and it is extremely difficult to remove molybdenum which has been co-precipitated with the uranium.

The present invention is based on the discovery that an improved uranium product relatively uncontaminated by molybdenum can be obtained from a sulphate solution with a pH not exceeding about 5.5 by carrying out the uranium precipitation step at a pH in the range of from about 8 to about 10 without permitting the pH of the uranium and molybdenum containing sulphate solution to exist for any significant time at a pH of around 7. In accordance with the invention, uranium and molybdenum containing sulphate solution and ammonia are reacted at a pH in the range of from about 8 to about 10. In a continuous operation, the uranium and molybdenum containing sulphate solution and the ammonia solution are added at a rate to maintain the pH of the resultant slurry within this range. With this procedure, the resultant precipitate of uranium values is relatively uncontaminated by molybdenum. It has also been found that it is necessary to separate the uranium containing precipitate from the remaining solution with the pH of the remaining solution being within the same range as the pH of the precipitation step.

With the present invention, substantially all the uranium can be precipitated while retaining most of the molybdenum in solution. It is important that, in the precipitation step, the pH of the original solution be adjusted directly from its initial value less than about 5.5 to a value in the range of from about 8 to about 10, that is to say without the slurry existing for any significant time at a stage when its pH is around 7, since the problem described in the preceding paragraph would then be encountered, i.e. undesirably high precipitation of molybdenum with the uranium. The slurry is preferably vigorously agitated to ensure that a pH of about 7 does not exist for any significant time.

This step is most conveniently carried out in a continuous operation, but it can also be carried out in a batch operation.

It has also been found that, at the relatively high pH of about 8 to about 10 of the precipitation step in accordance with the present invention, although the settling rate of the uranium precipitate is somewhat lower than in the prior art precipitation step at lower pH, the filtration and washing characteristics of the uranium precipitate are equally as good as at the lower pH values. The lower settling rate is readily acceptable in return for the unexpectedly improved uranium-molybdenum separation achieved by the present invention.

The separation of the uranium precipitate from the remaining solution must also be carried out at the relatively high pH of the present invention since, although reduction of pH to a lower value, say about 7.5, may improve the settling rate, such pH reduction will cause molybdenum to be precipitated from the solution with resultant contamination of the uranium precipitate.

The settling rate of the uranium precipitate may be improved by carrying out the precipitation step at a pH higher than about 9, but only at the expense of providing the greater amounts of ammonia required. Commercially therefore, a pH in the range of from about 8.5 to about 9 is preferred. The uranium and molybdenum containing sulphate solution may contain from about 10 to about 50 g/L $U_3O_8$, more preferably from about 15 to about 35 g/L $U_3O_8$, and from about 0.02 to about 2 g/L molybdenum. The solution may also contain from about 100 to about 250 g/L ammonium sulphate.

The process of the present invention can be satisfactorily carried out at a temperature of around 30° C.

Figure 2:
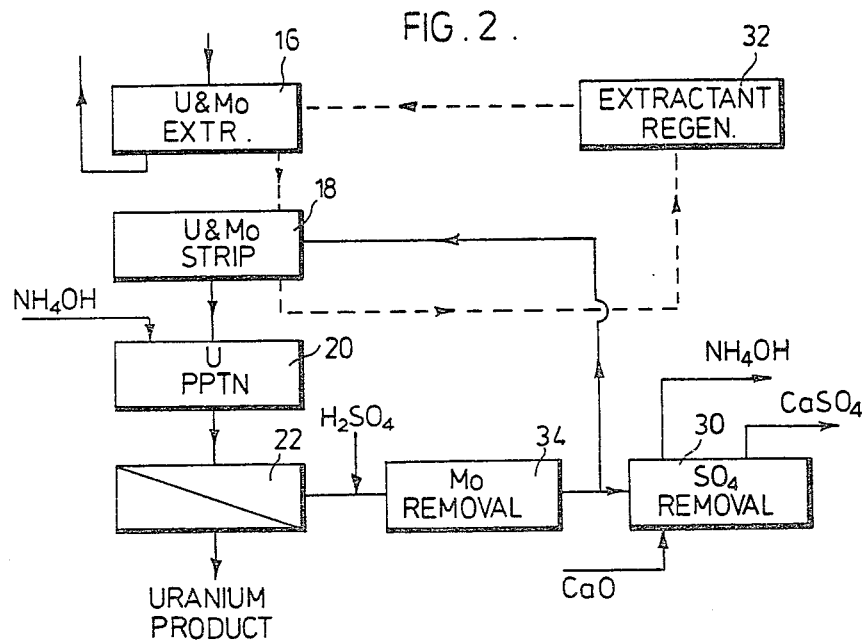

Embodiments of the invention will now be described, by way of example, with reference to the accompanying drawings, of which:

FIG. 1 is a flow diagram of a uranium recovery process incorporating one embodiment of the invention, and FIG. 2 is a similar view showing a second embodiment.

Referring first to FIG. 1 of the drawings, uranium-bearing ore containing molybdenum and other impurities is leached in leach step 12 in aqueous sulphuric acid solution under oxidizing conditions. The leach slurry is passed to a liquid-solids separation step 14, and the solid residue is discarded. The leach solution proceeds to a solvent extraction step 16 in which uranium and molybdenum values are extracted from the soultion by an extractant mixture comprising tertiary amines, isodecanol and kerosene. The uranium and molybdenum barren solution, i.e. the raffinate, is dealt with as desired.

The loaded extractant is stripped of uranium and molybdenum in a stripping step 18 by ammonium sulphate solution with ammonia addition to give a pH of about 3.5 to about 5.5. The uranyl sulphate/ammonium sulphate solution then passes to a uranium precipitation step 20 in accordance with the invention in which the pH is maintained at a value in the range of from about 8.5 to about 9 by controlling the rate of addition of the loaded ammonium sulphate solution and ammonia solution and vigorously agitating the resultant slurry. The resultant slurry then proceeds to a liquid-solids separation step 22 which is maintained at the same pH as the precipitation step 20 and from which uranium product is obtained.

A portion of the uranium depleted ammonium sulphate solution containing dissolved molybdenum is acidified to a pH of about 1.5 to about 3.5, preferably about 3.0, by the addition of sulphuric acid and is passed to a molybdenum extraction step 24. In this step, molybdenum is loaded onto stripped extractant from the stripping step 18, and the molybdenum depleted ammonium sulphate solution is thereafter returned to the stripping step 18. The molybdenum loaded extractant then passes to a molybdenum stripping step 26 where molybdenum is stripped from the loaded extractant by a bleed from the ammonium sulphate solution leaving the liquid-solids separation step 22, the molybdenum stripping being carried out at a pH of about 5 obtained by addition of ammonia. The bleed solution may then be treated to remove molybdenum, for example in molybdenum precipitation step 28 where molybdenum may be precipitated by use of a sulphide. The bleed solution then passes to a sulphate removal step 30 to remove sulphate ions from the solution, for example by adding lime and boiling the solution. If the molybdenum precipitation step 28 is omitted, molybdenum may be precipitated with the sulphate ions in the sulphate removal step 30. The resultant ammonia solution can be used anywhere in the process where ammonia is required, and the resultant calcium sulphate is removed.

After leaving the molybdenum stripping step 26, the stripped extractant passes through a regeneration step 32 in which the extractant is regenerated by sodium carbonate solution, which removes remaining impurities such as silica. The regenerated extractant passes to the solvent extractant step 16.

Alternatively, the molybdenum loaded extractant from the solvent extraction step 24 may be passed directly to the regeneration step 32 where molybdenum will be removed by the sodium carbonate solution. In this case, the molybdenum stripping step 26 and molybdenum precipitation step 28 will be omitted.

In the embodiment shown in FIG. 2, the remaining solution from the liquid-solids separation step 22 is acidified with sulphuric acid to a pH of from about 1.5 to about 3.0 and passed to a molybdenum removal step 34 in which the molybdenum is removed by adsorption by activated carbon. Since the solution at this stage is essentially barren of uranium and contains virtually no entrained organics or crud from the stripping step 18, recovery of molybdenum in this manner can be more efficiently carried out than if carried out directly on the strip solution from step 18.

Comparative tests of uranium precipitation in accordance with the invention and in accordance with the prior art will now be described. The tests were carried out with uranium and molybdenum containing ammonium sulphate solution from the stripping step 18, the solution containing (in g/L) 15.9 $U_3O_8$, 0.032 molybdenum and 130 $(NH_4)_2SO_4$.

EXAMPLE 1

The solution and a concentrated ammonium hydroxide solution were added continuously and simultaneously to a vigorously agitated ammonium sulphate solution at a pH of 9 in such a manner as to maintain the pH at 9 to precipitate a uranium product in accordance with the invention. Subsequent analysis showed that the uranium product contained only 0.040% molybdenum with 75% of the molybdenum therefore remaining in solution.

EXAMPLE 2

A comparative test was then carried out in accordance with the prior art, the pH being 7.0. Analysis showed that the uranium product contained 0.158% molybdenum, with there consequently being only 6% of the molybdenum remaining in solution. The advantage of the present invention is therefore self-evident.

EXAMPLE 3

Solution with the same composition as in Example 1 was adjusted to pH 7.2 with ammonia, a sample of the product was collected and washed and found to analyse 83.7% $U_3O_8$ and 0.165% Mo. The thickened yellow cake product slurry was adjusted to pH 9.5–10.0 with ammonia and stirred at 24°, 40° and 60° C. for up to 24 h in an effort to dissolve the molybdenum from the product. At best, however, the molybdenum content was only lowered from 0.165 to 0.124%. The addition of a small quantity of hydrogen peroxide to the slurry had no effect. It appears, therefore, that during the yellow cake precipitation at a pH about 7, the bulk of the molybdenum was co-precipitated as a complex compound not readily convertible to soluble molybdate forms. A similar problem arose when uranium was precipitated at a pH of 9.1 and the pH was reduced to about 7 to separate the precipitate from the solution.

The invention is applicable to the recovery of uranium values from solutions containing dissolved uranium and molybdenum at a pH not exceeding about 5.5 which have been obtained in other ways than previously described. For example, the loaded extractant previously described may be stripped with sodium carbonate to strip both uranium and molybdenum. The resultant sodium carbonate/uranium carbonate strip solution may be acidified with sulphuric acid to a pH of about 4 to drive off carbon dioxide and convert the solution to a uranyl sulphate/sodium sulphate system, which may then be treated in accordance with the invention.

The ore may be directly leached with sodium carbonate/bicarbonate to dissolve both uranium and molybdenum to produce a sodium carbonate/uranium carbonate solution which may be treated as described in the preceding paragraph. Uranium may be extracted from a leach solution by a strong basic ion exchange resin, and stripped with sulphuric acid to produce a highly acid solution containing dissolved uranium and molybdenum. This solution may be neutralised to a pH of about 2 or 3 with lime to remove excess acid as gypsum. The resultant uranyl sulphate solution may be treated in accordance with the present invention.

Other embodiments of the invention will be apparent to a person skilled in the art, the scope of the invention being defined in the appended claims.

What we claim as new and desire to protect by Letters Patent of the United States is:

1. A process for recovering uranium values from a sulphate solution containing dissolved uranium and molybdenum and with a pH not exceeding about 5.5, comprising reacting said uranium and molybdenum containing sulphate solution with ammonia at a pH in the range of from about 8 to about 10, without the solution existing for any significant time at a pH of around 7, with resultant precipitation of uranium values relatively uncontaminated by molybdenum, and separating the uranium containing precipitate from the remaining solution while maintaining the pH of the remaining solution within said range.

2. A process according to claim 1 wherein said pH range is from about 8.5 to about 9.

3. A process according to claim 1 wherein the uranium and molybdenum containing sulphate solution contains from about 10 to about 50 g/L $U_3O_8$ and from about 0.02 to about 2 g/L molybdenum.

4. A process according to claim 3 wherein the uranium and molybdenum containing solution contains from about 15 to about 35 g/L $U_3O_8$.

5. A process according to claim 1 wherein the uranium and molybdenum containing solution contains from about 100 to about 250 g/L ammonium sulphate.

6. A process according to claim 1 wherein at least a portion of the molybdenum containing remaining solution is acidified to a pH within the range of from about 1.5 to about 3.0 and subjected to a molybdenum removal step.

7. A process according to claim 6 wherein the molybdenum removal step comprises adsorption of molybdenum by activated carbon.

8. A process according to claim 6 wherein the molybdenum removal step comprises treating the remaining solution with a solvent extractant to load molybdenum onto the solvent extractant from the remaining solution, and subsequently stripping the molybdenum from the loaded solvent extractant by means of a stripping solution.

9. A process according to claim 8 wherein said molybdenum stripping is carried out at a pH of about 5 and the stripping solution comprises a portion of the molybdenum containing remaining solution.

10. A process according to claim 9 wherein after stripping molybdenum from the loaded solvent extractant, molybdenum is precipitated from the stripping solution by use of a sulphide.

11. A process according to claim 8 wherein the solvent extractant comprises solvent extractant used to extract uranium and molybdenum from a uranium and molybdenum containing solution and from which uranium and molybdenum have been stripped.

12. A process according to claim 1 wherein the reaction step is carried out as a continuous operation in which said uranium and molybdenum solution and ammonia are added at a rate to maintain the pH within said range.

* * * * *